US011183178B2

(12) United States Patent
Khalil et al.

(10) Patent No.: US 11,183,178 B2
(45) Date of Patent: Nov. 23, 2021

(54) ADAPTIVE BATCHING TO REDUCE RECOGNITION LATENCY

(71) Applicant: Microsoft Technology Licensing, LLC, Redmond, WA (US)

(72) Inventors: Hosam A. Khalil, Redmond, WA (US); Emilian Y. Stoimenov, Redmond, WA (US); Yifan Gong, Sammamish, WA (US); Chaojun Liu, Redmond, WA (US); Christopher H. Basoglu, Everett, WA (US); Amit K. Agarwal, Redmond, WA (US); Naveen Parihar, Bellevue, WA (US); Sayan Pathak, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 32 days.

(21) Appl. No.: 16/773,205

(22) Filed: Jan. 27, 2020

(65) Prior Publication Data

US 2021/0217410 A1    Jul. 15, 2021

Related U.S. Application Data

(60) Provisional application No. 62/960,240, filed on Jan. 13, 2020.

(51) Int. Cl.
*G10L 15/05* (2013.01)
*G10L 15/197* (2013.01)
(Continued)

(52) U.S. Cl.
CPC ............ *G10L 15/197* (2013.01); *G10L 15/02* (2013.01); *G10L 15/05* (2013.01); *G10L 15/22* (2013.01); *G10L 15/30* (2013.01)

(58) Field of Classification Search
CPC ......... G10L 15/02; G10L 15/05; G10L 15/16; G10L 15/22; G10L 15/30; G10L 15/32; G10L 15/197; G06N 20/00
(Continued)

(56) References Cited

U.S. PATENT DOCUMENTS 9,401,140 B1    7/2016    Weber et al.
9,514,747 B1    12/2016    Bisani et al.
(Continued)

OTHER PUBLICATIONS

"International Search Report and Written Opinion Issued in PCT Application No. PCT/US2020/065034", dated Apr. 7, 2021, 32 Pages.
(Continued)

*Primary Examiner* — Susan I McFadden
(74) *Attorney, Agent, or Firm* — Buckley, Maschoff & Talwalkar LLC

(57) ABSTRACT

Embodiments may include collection of a first batch of acoustic feature frames of an audio signal, the number of acoustic feature frames of the first batch equal to a first batch size, input of the first batch to a speech recognition network, collection, in response to detection of a word hypothesis output by the speech recognition network, of a second batch of acoustic feature frames of the audio signal, the number of acoustic feature frames of the second batch equal to a second batch size greater than the first batch size, and input of the second batch to the speech recognition network.

20 Claims, 13 Drawing Sheets

(51) Int. Cl.
   *G10L 15/30*     (2013.01)
   *G10L 15/22*     (2006.01)
   *G10L 15/02*     (2006.01)

(58) Field of Classification Search
   USPC ........................................................ 704/257
   See application file for complete search history.

(56) References Cited

U.S. PATENT DOCUMENTS

| | | | |
|---|---|---|---|
| 9,613,624 | B1 | 4/2017 | Kramer et al. |
| 10,319,374 | B2 | 6/2019 | Catanzaro et al. |
| 10,380,997 | B1 | 8/2019 | Ward et al. |
| 10,388,272 | B1 * | 8/2019 | Thomson ............... G10L 15/063 |
| 10,482,873 | B2 * | 11/2019 | Heigold ................ G10L 15/063 |
| 10,573,312 | B1 * | 2/2020 | Thomson ................. G10L 15/26 |
| 10,672,384 | B2 * | 6/2020 | Heigold ................ G06N 3/0454 |
| 10,916,238 | B2 * | 2/2021 | Heigold ................ G10L 15/063 |
| 10,990,878 | B2 * | 4/2021 | Olabiyi ................ G06N 3/0454 |
| 2001/0033583 | A1 | 10/2001 | Rabenko et al. |
| 2007/0129943 | A1 | 6/2007 | Lei et al. |
| 2015/0005919 | A1 | 1/2015 | Mcgatha et al. |
| 2015/0379072 | A1 | 12/2015 | Dirac et al. |
| 2016/0217367 | A1 | 7/2016 | Moreno et al. |
| 2017/0075882 | A1 | 3/2017 | Waibel |
| 2017/0213556 | A1 | 7/2017 | Buck et al. |
| 2017/0236518 | A1 | 8/2017 | Lane et al. |
| 2018/0012593 | A1 | 1/2018 | Prasad et al. |
| 2018/0061397 | A1 | 3/2018 | Huang et al. |
| 2018/0174576 | A1 | 6/2018 | Soltau et al. |
| 2018/0366109 | A1 | 12/2018 | Huang et al. |
| 2019/0028528 | A1 | 1/2019 | Dolson |
| 2019/0156816 | A1 | 5/2019 | Singh et al. |

OTHER PUBLICATIONS

Xue, et al., "Improving Latency-Controlled BLSTM Acoustic Models for Online Speech Recognition", In Proceedings of IEEE International Conference on Acoustics, Speech and Signal Processing, Mar. 5, 2017, pp. 5340-5344.

* cited by examiner

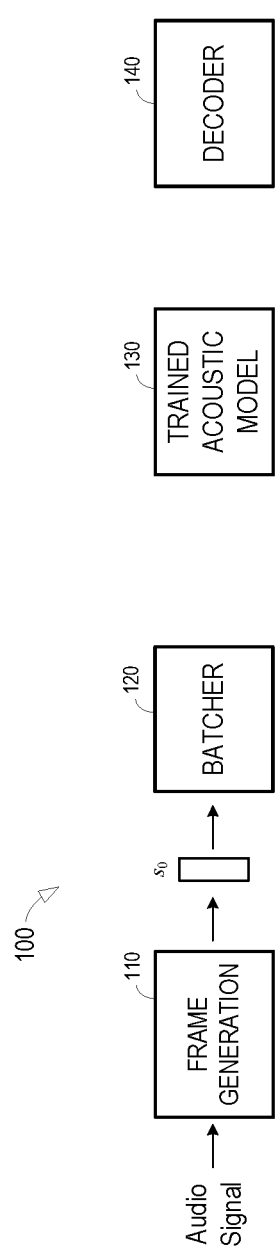
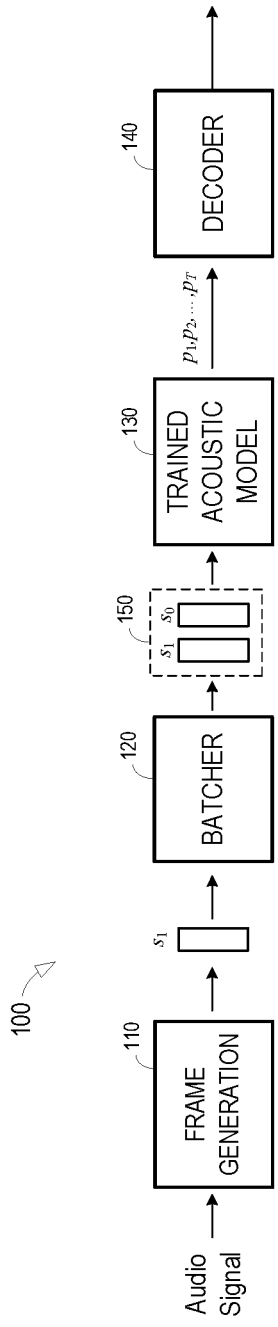
FIG. 1A
FIG. 1B

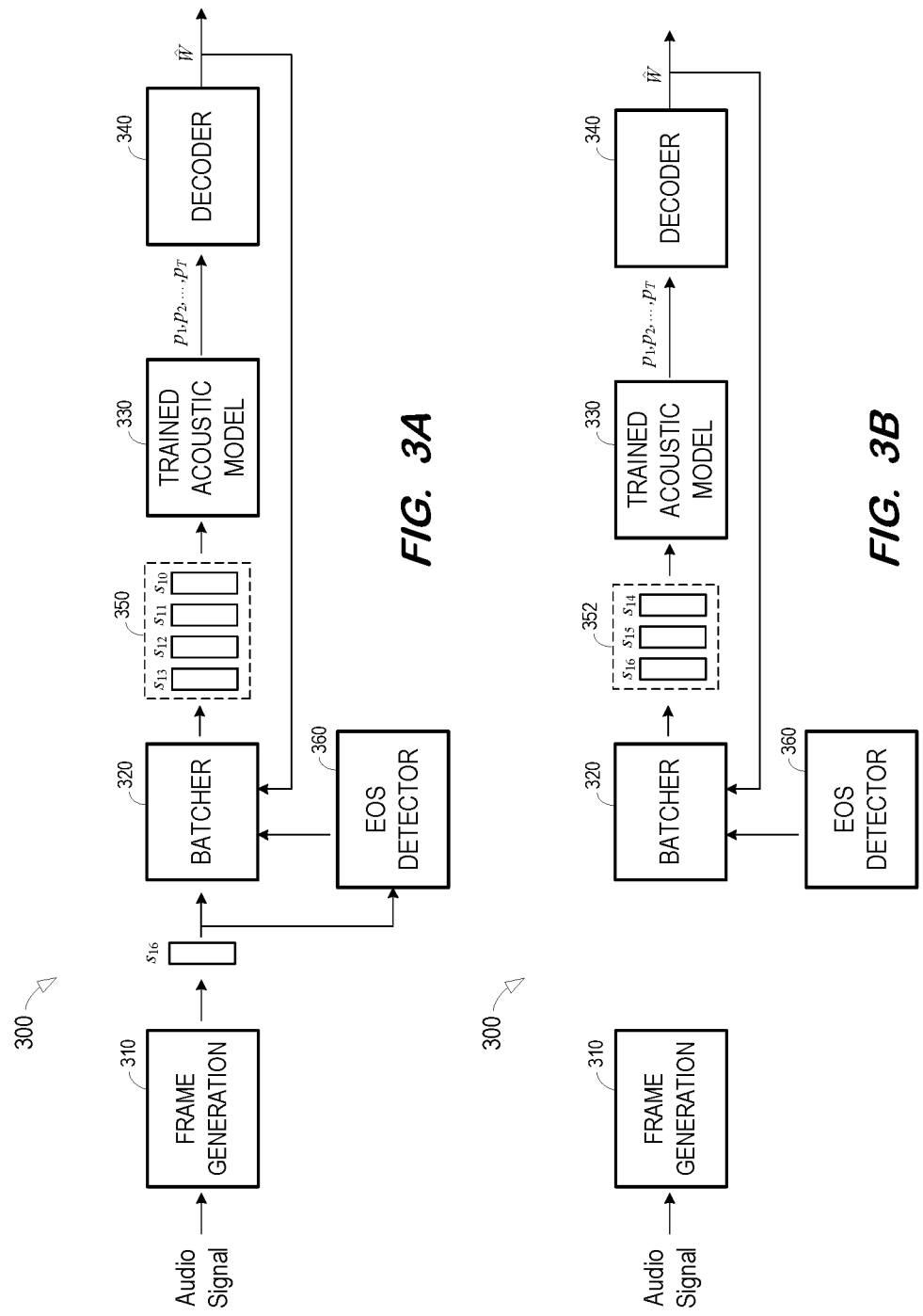

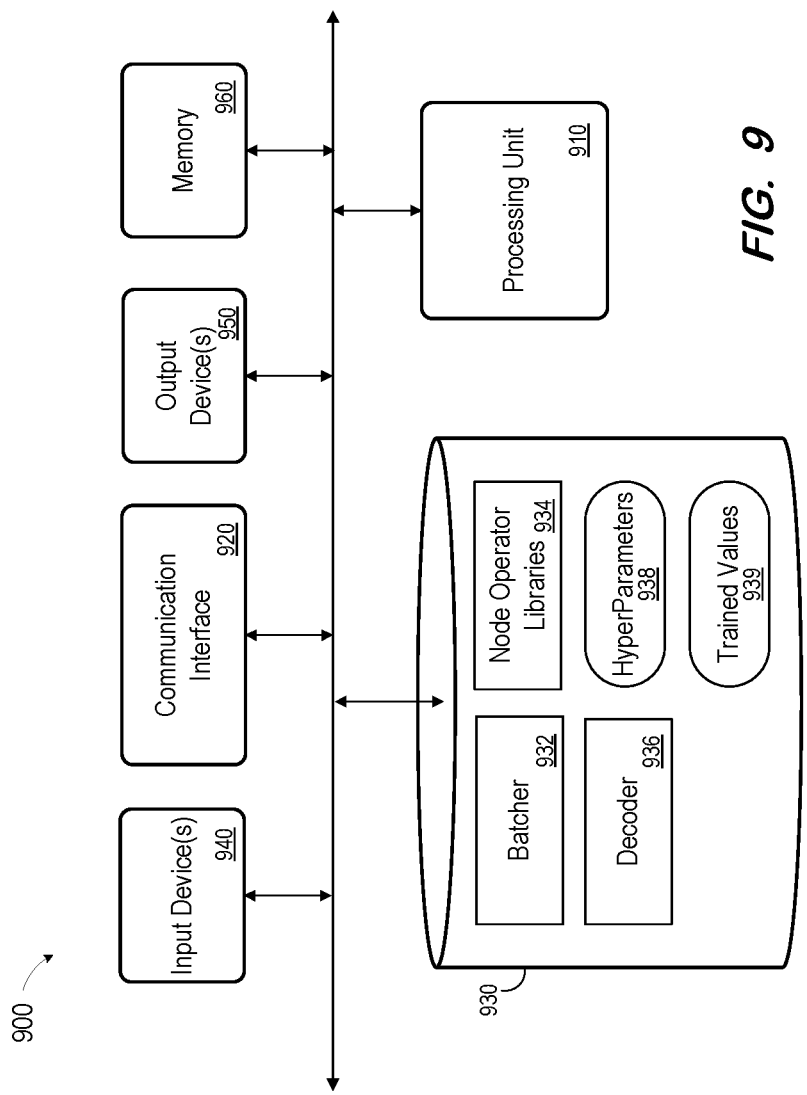

ADAPTIVE BATCHING TO REDUCE RECOGNITION LATENCY

CROSS-REFERENCE TO RELATED APPLICATIONS

The present application claims priority to U.S. Provisional Patent Application No. 62/960,240, filed Jan. 13, 2020, the contents of which are incorporated herein by reference for all purposes.

BACKGROUND

Neural network-based models are commonly used to perform automatic speech recognition (ASR). In some examples, a neural network-based acoustic model is trained to extract senone-discriminative features from input audio frames and to classify senones based on the extracted features. A decoder generates word hypotheses based on the classifications and outputs corresponding text.

The input audio frames may be batched into a batch of two or more frames to allow for joint processing and recognition, with the goal of improving accuracy and performance. However, batching requires the system to wait to receive all frames of the batch before submitting the batch to the ASR. This waiting may result in undesirable user-perceived latency regardless of the processing speed of the ASR.

Conventional ASR systems may use several physically-different models to satisfy different latency requirements within a given deployment. This approach multiplies processor-related training and deployment costs. Systems are desired to improve latency without resorting to parallel models.

BRIEF DESCRIPTION OF THE DRAWINGS

FIG. 1A is a block diagram of a speech recognition system employing initial latency-sensitive adaptive batching during operation according to some embodiments.

FIG. 1B is a block diagram of a speech recognition system employing initial latency-sensitive adaptive batching during operation according to some embodiments.

FIG. 3A is a block diagram of a speech recognition system employing terminal latency-sensitive adaptive batching during operation according to some embodiments.

FIG. 3B is a block diagram of a speech recognition system employing terminal latency-sensitive adaptive batching during operation according to some embodiments.

FIG. 9 is a block diagram of a speech recognition system according to some embodiments.

DETAILED DESCRIPTION

Figure 1C:
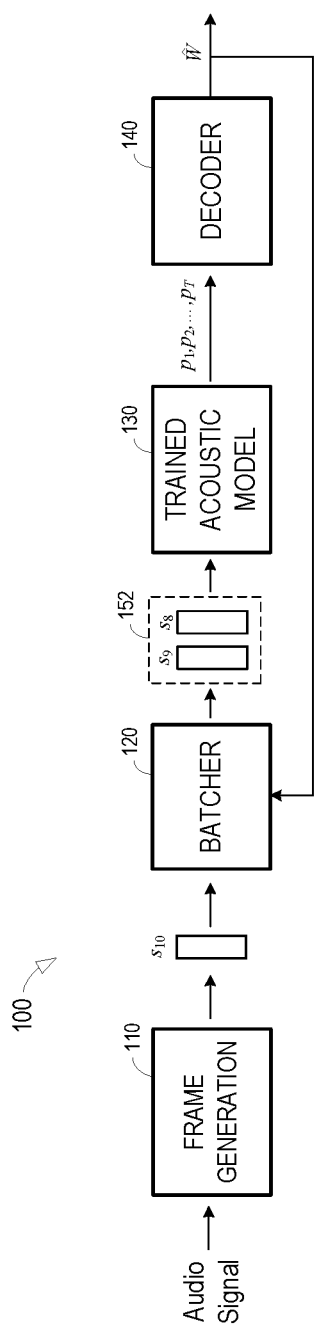
FIG. 1C is a block diagram of a speech recognition system employing initial latency-sensitive adaptive batching during operation according to some embodiments.

The following description is provided to enable any person in the art to make and use the described embodiments. Various modifications, however, will remain readily apparent to those of ordinary skill in the art.

According to some embodiments, the number of frames which are simultaneously-input to an acoustic model (i.e., the batch size) is dynamically controlled during ASR processing. For example, a small batch size is used until a word hypothesis is generated. Use of a small batch size may provide lower latency than a larger batch size because less time is required to collect a small batch than to collect a larger batch of identically-sized frames. The batch size may then be increased after the word hypothesis is generated, which may improve processing efficiency because simultaneously processing of a larger number of frames is more CPU- and cache-efficient than the processing of a smaller number of frames. A user may therefore be presented with a word hypothesis quickly while retaining most of the processing advantages of larger batch sizes.

Some embodiments are operable in conjunction with models employing look-ahead frames within each batch of input frames, where the number of look-ahead frames relates to the degree of overlap between consecutive batches of input frames. These embodiments may also dynamically control batch sizes as described above to provide low initial user-perceived latency and, subsequent to a first hypothesis, further provide improved processing efficiency.

Some models are operable to receive input batches of various size and including various numbers of look-ahead frames. By dynamically increasing the batch size in response to a first hypothesis, embodiments using such models may provide low initial user-perceived latency and, thereafter, improved processing efficiency as described above. Moreover, increased recognition accuracy may be achieved by increasing the number of look-ahead frames in response to the first hypothesis.

In this regard, such an acoustic model may be trained in view of a particular number of look-ahead frames which is greater than the initially-used number of look-ahead frames. Therefore, although initial operation is suboptimal, changing the number of look-ahead frames to the number of look-ahead frames based on which the acoustic model was trained may result in increased recognition accuracy. Embodiments may also allow for changing the number of look-ahead frames while holding the batch size constant.

Additionally or alternatively, some embodiments monitor the input frames independently of the hypothesis generation in order to detect an end-of-speech state. Upon detecting this state, the batch size may be reduced to avoid waiting for non-speech frames which would otherwise be added to a current batch of input frames. The batch size may be additionally or alternatively reduced in response to detection of an end-of-stream, of a target maximum processing time, or other condition. Such embodiments may therefore support an early exit from the batching process and reduce latency in the generation of a final hypothesis.

FIG. 1A illustrates speech recognition system 100 employing initial latency-sensitive adaptive batching during operation according to some embodiments. System 100 may be implemented using any suitable combinations of hardware and software components. Each illustrated function of system 100 or otherwise described herein may be implemented by one or more computing devices (e.g., computer servers), storage devices (e.g., hard or solid-state disk drives), and other hardware as is known in the art. The components may be located remote from one another and may be elements of one or more cloud computing platforms, including but not limited to a Software-as-a-Service, a Platform-as-a-Service, and an Infrastructure-as-a-Service platform. According to some embodiments, one or more components are implemented by one or more dedicated virtual machines executing one or more trained neural network models.

Frame generation unit 110 receives an audio signal and generates a frame-level magnitude spectra, or raw acoustic feature frame, corresponding to a respective frame of the audio signal as is known in the art. For example, assuming an audio frame size of 25 ms, frame generation unit 110 generates first raw acoustic feature frame so based on the first 25 ms of the incoming audio signal. In this regard, FIG. 1A illustrates the commencement of ASR based on the incoming audio signal.

A next raw acoustic feature frame may be generated based on a next 25 ms of the incoming audio signal. In some embodiments, temporally-adjacent raw acoustic feature frames may represent overlapping frames of the audio signal. For example, first raw acoustic feature frame so may be generated based on the first 25 ms of the incoming audio signal, while a next raw acoustic feature frame may be generated based on a 15 ms through 40 ms frame of the incoming audio signal, and a third raw acoustic feature frame may be generated based on a 30 ms through 55 ms frame of the incoming audio signal.

According to some embodiments, the generated raw acoustic feature frames are Mel-Frequency Cepstral Coefficients or log-filterbank features as is known in the art. Frame generation unit 110 may implement any suitable signal processing to determine a raw acoustic feature frames corresponding to a respective frame of the incoming audio signal. For example, frame generation unit 110 may implement a custom-designed Fast Fourier Transform and custom filterbank parameters.

Batcher 120 operates to collect raw acoustic feature frames into batches and provide the batches to trained acoustic model 130. Trained acoustic model 130 may comprise any acoustic model capable of processing batches of input frames having various batch sizes. For example, trained acoustic model 130 may comprise a uni-directional long short-term memory model (LSTM), a bi-directional LSTM (BLSTM) model, or a layer-trajectory LSTM (ltLSTM), but embodiments are not limited thereto.

According to some embodiments as will be described below, trained acoustic model 130 is also capable of processing batches of input frames which include look-ahead frames. Trained acoustic model 130 may support only a fixed number of look-ahead frames (e.g., a contextual layer-trajectory LSTM (cltLSTM) model) or may support batches including varying numbers of look-ahead frames (e.g., a latency-controlled BLSTM (LC-BLSTM) model).

Decoder 140 forms word hypotheses based on the output of trained acoustic model 130. According to some non-exhaustive examples, model 130 outputs senone posteriors in response to a received batch of input frames. Based on the posteriors and hidden Markov models, decoder 140 outputs a most probable sequence of words $\hat{W}=w_0 \ldots w_m$ given input frames $S=s_0 \ldots s_n$.

Batcher 120 may determine a batch size and/or a number of look-ahead frames based on which the batches are collected. As described herein, the determination may be based on word hypotheses generated by decoder 140 and/or on an otherwise-detected end-of-speech state. Accordingly, batcher 120 may implement a function which determines a batch size (and, in some embodiments, a number of look-ahead frames) based on a received work hypothesis and/or end-of-speech signal.

FIG. 1B illustrates continued operation of system 200 according to the present example. As shown, frame generation unit 110 has generated frame $s_1$ based on a second (potentially-overlapping) frame of the input audio signal. It will be assumed that the initial batch size is set to two. Batcher 120 has previously received frame $s_0$ as illustrated in FIG. 1A. Due to the initial batch size of two, batcher 120 collects frames $s_0$ and $s_1$ into batch 150 and provides batch 150 to trained acoustic model 130. Model 130 outputs corresponding posteriors based upon its architecture and trained parameter values as is known in the art. The posteriors are received by decoder 140, which proceeds to attempt to form a hypothesis.

According to some embodiments, the above process continues as shown with respect to subsequently-received frames of the audio signal. For example, FIG. 1C illustrates generation of frame $s_{10}$ based on a respective frame of the audio signal. At this point, batcher 120 has already collected frames $s_8$ and $s_9$ into batch 152, and passes these frames to model 130.

It will be assumed that decoder 140 now generates a non-silent, non-noise hypothesis based on the batches received up to the present point. As illustrated, the hypothesis is returned to batcher 120. Based on the generation of the hypothesis, batcher 120 determines to increase the batch size.

The determination to change the batch size and/or of the new batch size based on the hypotheses may be performed by a component different from batcher 120. Such a component may therefore transmit the new batch size to batcher 120 so batcher 120 may conform subsequent batching to the new batch size.

Determination of a new batch size may be triggered by a first-generated word hypothesis but embodiments are not limited thereto. The determination may be triggered by an n-th-generated word hypothesis, by generation of one (or more) of a particular subset of word hypotheses, or by any other function of word hypotheses output by decoder 140.

Figure 1D:
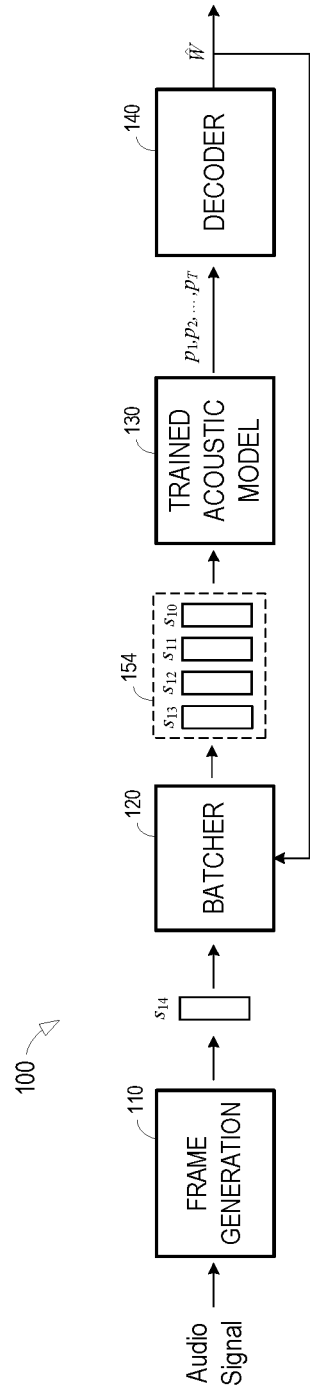
FIG. 1D is a block diagram of a speech recognition system employing initial latency-sensitive adaptive batching during operation according to some embodiments.

FIG. 1D illustrates implementation of the new batch size according to some embodiments. The new batch size is assumed to be four, although embodiments are not limited thereto. Accordingly, after the output of batch 152 as shown in FIG. 1C, batcher 120 collects frames $s_{10}$ through $s_{14}$ into batch 154 and provides batch 154 to model 130. In contrast, if the batch size had remained at two, batcher 120 would have collected only frames $s_{10}$ and $s_{11}$ into a batch and provided that batch to model 130.

The illustrated process may continue, with batches consisting of four frames, until ASR terminates (e.g., the end of the audio signal has been reached). According to some embodiments, the batch size is reduced to the initial batch size (e.g., two) upon detecting silence based on the output of decoder 140, and is again increased as described above in response to a word hypothesis.

In some embodiments, the batch size may increase gradually to a target batch size. With respect to the above example, batcher 120 may increase the batch size from two to three for a particular time period, and then may increase the batch size from three to four. The increases may be effected based on the generation of further hypotheses instead of, or in addition to, on elapsed time.

Figure 2:
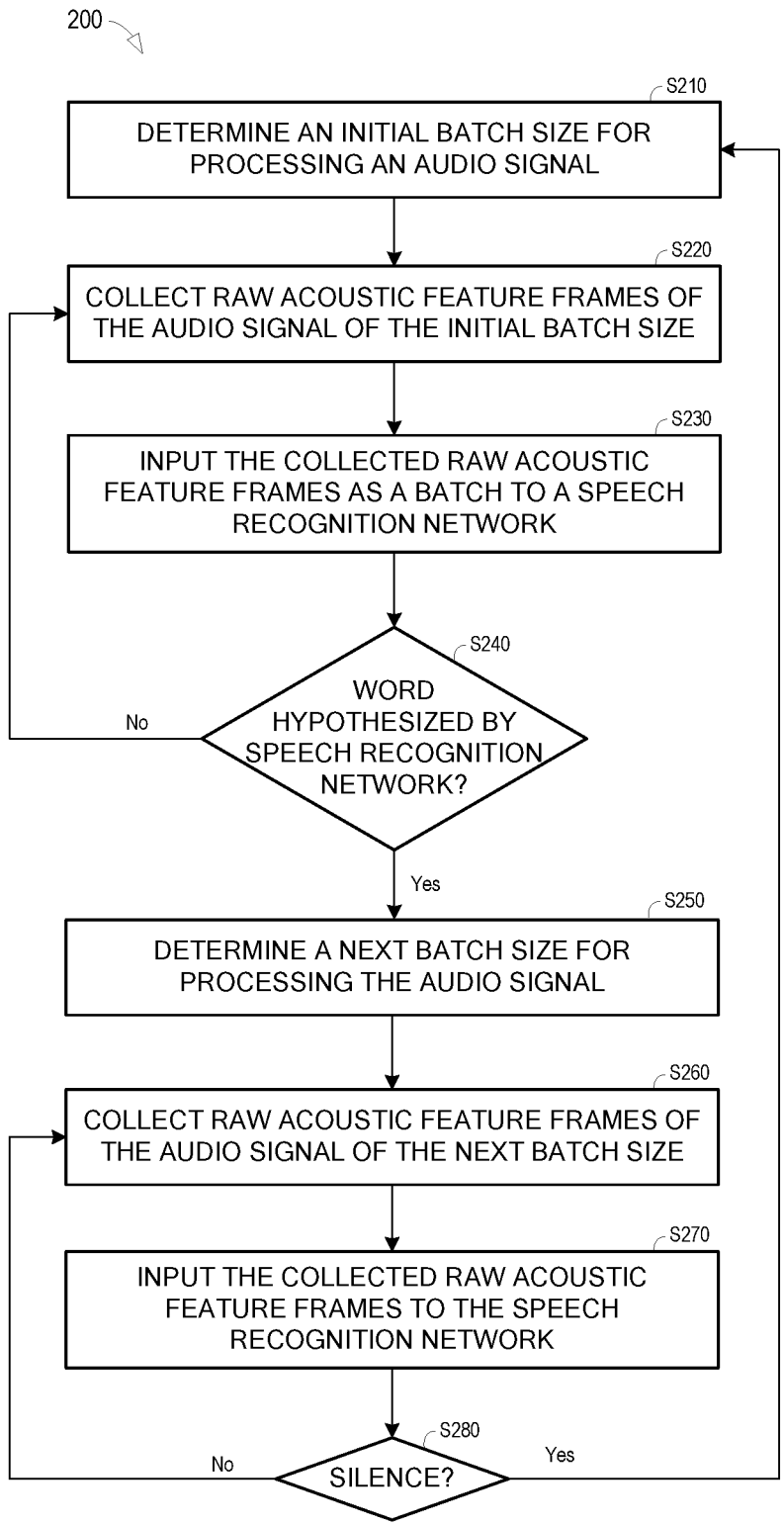
FIG. 2 is a flow diagram of a process for initial latency-sensitive adaptive batching according to some embodiments.

FIG. 2 is a flow diagram of process 200 to provide dynamic batching according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described herein.

Process 200 may be initiated in response to a request to perform ASR on an audio signal. Process 200 may be executed, for example, by a cloud-based ASR service which receives the request and audio signal from a cloud-based meeting provider. The audio signal may be received as a near real-time stream according to some embodiments. In some embodiments, process 200 executes continuously to process any signal which is present on an incoming audio channel.

An initial batch size for processing the audio signal is determined at S210. The initial batch size may be a predefined experimentally-determined value. The initial batch size may be selected from several values based on a desired initial latency, where lower latency corresponds to smaller batch sizes. With reference to the example of FIGS. 1A through 1D, an initial batch size of two frames is determined at S210.

Raw acoustic feature frames of the audio signal are collected at S220. The number of collected raw acoustic feature frames is equal to the determined initial batch size. Accordingly, with respect to the above example, flow pauses at S220 while batcher 120 waits to receive frames $s_0$ and $s_1$ from frame generation unit 110.

The collected frames are input as a batch to a speech recognition network at S230. The speech recognition network may comprise any system capable of generating word hypotheses based on batches of acoustic frames. Trained acoustic model 130 and decoder 140 of FIGS. 1A through 1D comprise a speech recognition network according to some embodiments.

Next, at S240, it is determined whether a word hypothesis has been generated by the speech recognition network. More specifically, S240 may comprise determination of whether the speech recognition network has generated a non-silent, non-noise hypothesis based on the batches received up to the present point. If not, flow returns to S220 to collect another batch of frames conforming to the initial batch size. Flow therefore cycles between S220, S230 and S240 until a word hypothesis has been generated by the speech recognition network. As described above, the determination at S240 is not limited to identification of a first-generated word hypothesis.

Although illustrated as a linear flow, the determination at S240 may occur independently of and in parallel with the cycling of flow between S220 and S230. For example, the collection and input of batches of frames may proceed until interrupted by a separate determination of a generated word hypothesis, after which flow proceeds to S250.

At S250, a next batch size for processing the audio signal is determined. The next batch size may be predetermined based on experimentation and/or selected from several possible batch sizes. According to some embodiments, the next batch size is eighty frames.

As described with respect to FIG. 1D, raw acoustic feature frames of the next batch size are collected at S260 and input to the speech recognition network at S270. According to some embodiments, flow cycles between S260 and S270 to collect and input batches of frames until silence is detected at S280. Silence detection at S280 may comprise detection of a lack of word hypotheses generated by the speech recognition network over a period of time or and/or may be otherwise heuristically-based.

According to the illustrated example, the detection of silence at S280 causes process 200 to return to S210 to reset the batch size to the initial batch size. Consequently, if later frames of the audio signal include speech, the user-perceived latency of processing that speech may be lower than a latency resulting from a larger batch size.

Switching from the initial batch size to the next batch size may introduce a noticeable delay in processing. Some embodiments may, in response to the determination at S240, gradually increase the batch size to a target batch size. For example, the batch size may increase by a predefined number for every n iterations of S260 until a target batch size is reached.

Process 200 may terminate upon reaching the end of the audio signal. In some embodiments, process 200 terminates in response to detection of an end-of-speech state. FIGS. 3A and 3B illustrate such processing according to some embodiments.

System 300 adds end-of-speech detector 360 to the above-described components of system 100. End-of-speech detector 360 receives raw acoustic frames directly from frame generation unit 310 and determines whether speech has ended based thereon. End-of-speech detector 360 may comprise any system for detecting an end-of-speech state based on input frames, and may include one or more trained neural networks. In one example, detector 360 is an LSTM classifier formulated and trained independently of the decoder hypotheses, and which predicts the end of the query based solely on past frames. Detector 360 may operate in conjunction with operational heuristics.

In one example of operation, components 310, 320, 330 and 340 have operated as described above to modify an initial batch size to a next batch size of four frames. Accordingly, batcher 320 has collected batch 350 of frames $s_{10}$ through $s_{13}$ for input to model 330. FIG. 3A also shows transmission of frame $s_{16}$ from frame generation unit 310 to batcher 320 and detector 360. Frame generation unit 310 has therefore already generated frames 514 and $s_{15}$, which have collected by batcher 320 in anticipation of generating a next four-frame batch.

It will be assumed that end-of-speech detector 360 detects an end-of-speech state in response to reception of frame $s_{16}$. In response, end-of-speech detector 360 notifies batcher 320 of the detected state. Batcher 320 then collects frame $s_{16}$ as a last frame of the current batch. FIG. 3B illustrates the foregoing operation, in which batcher 320 generates batch 352 including frames $s_{14}$, $s_{15}$ and $s_{16}$ and batch 352 is input to model 330. Accordingly, the batch size of the last batch is reduced to avoid waiting for non-speech frames which would otherwise be added to the current batch of input frames. Such embodiments may therefore support an early exit from the batching process and reduce latency in the generation of a final hypothesis. As mentioned above, the last batch size may be reduced in response to other conditions according to some embodiments, including but not limited to detection of an end-of-stream condition and detection of an elapsed maximum recognition time.

Figure 4A:
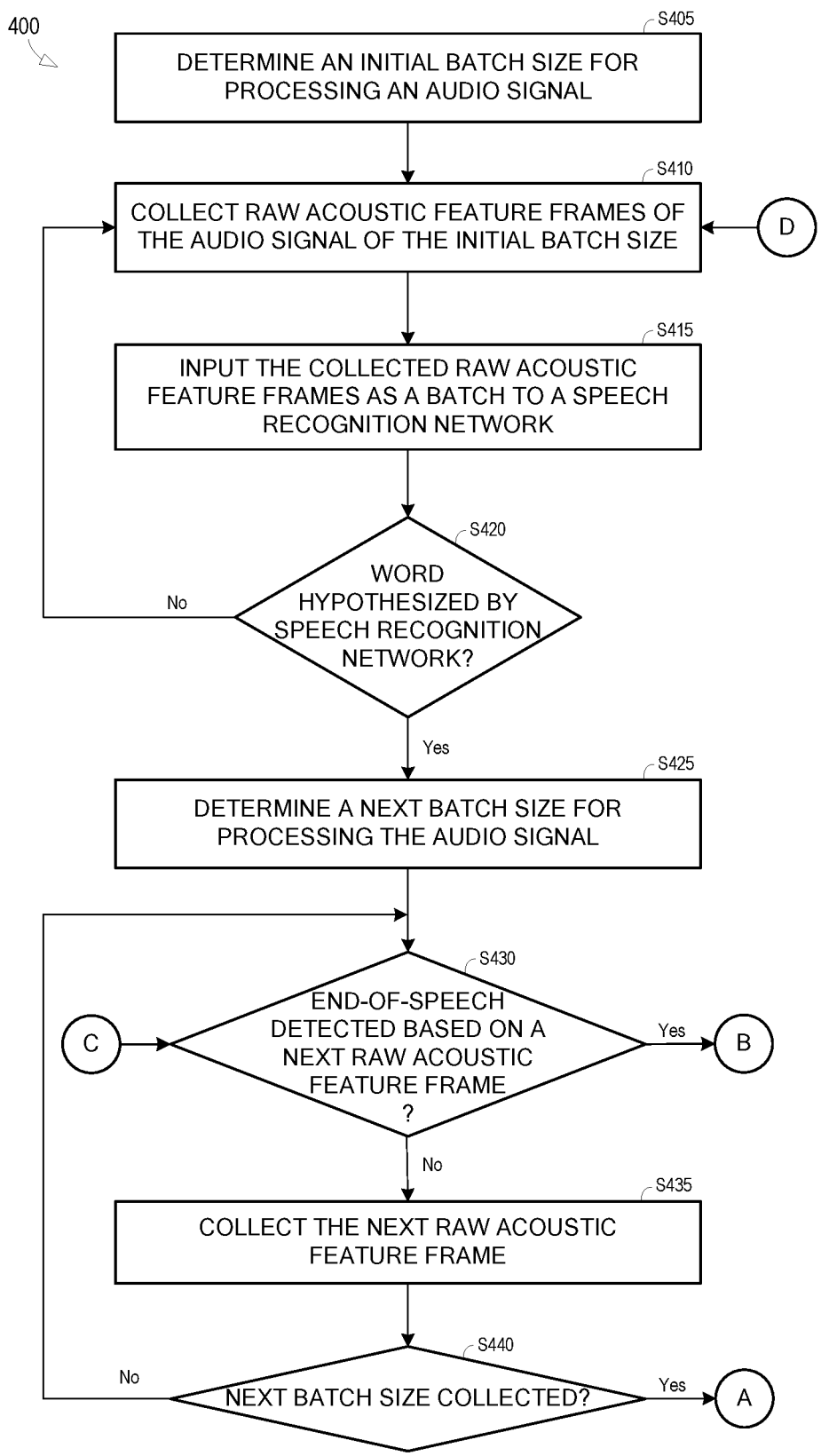
FIGS. 4A through 4C comprise a flow diagram of a process for initial and terminal latency-sensitive adaptive batching according to some embodiments.
Figure 4B:
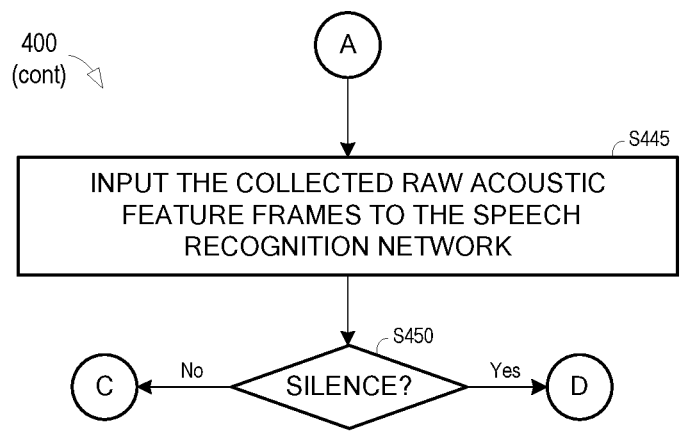
Figure 4C:
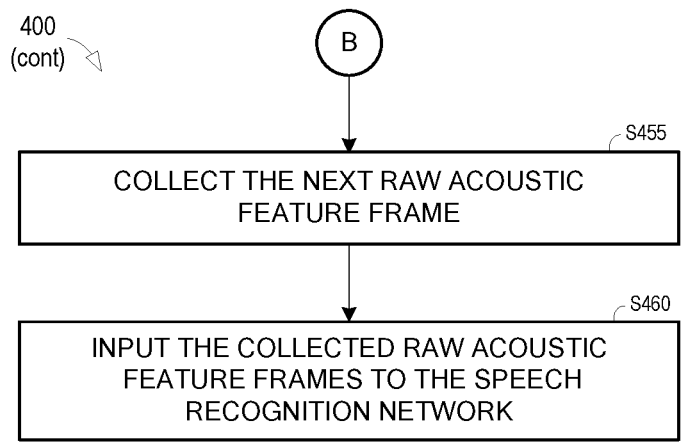

FIGS. 4A through 4C comprise a flow diagram of process 400 to provide dynamic batching according to some embodiments. Process 400 may be implemented by system 300 of FIG. 3, but embodiments are not limited thereto.

Steps S405, S410, S415, S420 and S425 may proceed similarly to respective ones of steps S210, S220, S230, S240 and S250 of process 200. As described, an initial batch size for processing an incoming audio signal is determined at S405 and a corresponding batch of raw acoustic feature frames of the audio signal is collected at S410.

The batch of collected frames is input to a speech recognition network at S415. Next, at S420, it is determined whether a suitable word hypothesis has been generated by the speech recognition network. If not, flow returns to S410 to collect another batch of frames conforming to the initial batch size. If so, a next batch size for processing the audio signal is determined at S425 as described above.

Next, at S430, it is determined whether an end-of-speech state has been detected based on a next raw acoustic feature frame. S430 may be executed by an end-of-speech detector operating independently of the speech recognition network as described with respect to FIGS. 3A and 3B. With reference to FIG. 3A, S430 may comprise receiving a frame from frame generation unit 310 and evaluating an end-of-speech state based on the received frame (and, e.g., on previously-received frames and/or other heuristics). If an end-of-speech state is not detected, flow continues to S435 to collect a next raw acoustic frame at S435. The frame may be collected at S435 for inclusion into a next batch of frames. In this regard, it is determined at S440 whether a batch conforming to the next batch size has been collected. If not, flow returns to S430.

It will be assumed that the determination at S430 continues to be negative as flow cycles between S430, S435 and S440 until the desired number of frames have been collected. Flow then continues to S445 to input the collected frames of the current batch to the speech recognition network. Flow returns to S430 if silence is not detected at S450. Flow therefore cycles between S430 and S450 to collect and input batches of frames of the current batch size until silence is detected at S450 or an end-of-speech state is detected at S430. The detection of silence at S430 causes flow to return to S405 to reset the batch size to the initial batch size. As mentioned above, if next-received frames of the audio signal include speech, the user-perceived latency of processing that speech may be lower than a latency which would resulting from a larger batch size.

Flow proceeds from S430 to S455 if an end-of-speech state is detected at S430 during the collection of batches of the next batch size. At S455, the next raw acoustic frame based on which the end-of-speech state was detected is collected. With reference to the example of FIGS. 3A and 3B, an end-of-speech state is detected at S430 based on frame $s_{16}$ and frame $s_{16}$ is then collected by batcher 320 at S455 as a last frame of the current batch. The collected frames of the current batch ($s_{14}$, $s_{15}$ and $s_{16}$) are then input to model 330 at S460, even though the size of the current batch is less than the next batch size determined at S425.

The determination at S420 may occur independently of and in parallel with the cycling of flow between S410 and S415. Similarly, the end-of-speech determination at S430 may also or alternatively occur independently of and in parallel with the cycling of flow from S435 through S450.

FIGS. 5A through 5D illustrate look-ahead-enabled speech recognition system 500 employing initial latency-sensitive adaptive batching during operation according to some embodiments. System 500 includes trained acoustic model 530 which supports "look-ahead" input frames as is known in the art. Trained acoustic model 530 may comprise any model architecture employing look-ahead frames that is or becomes known, including but not limited to a latency-controlled bi-directional long short-term memory (LC-BLSTM) acoustic model and a contextual layer-trajectory long short-term memory (cltLSTM) acoustic model. As is known in the art, a cltLSTM model may support only a fixed number of look-ahead frames while a LC-BLSTM model may support batches including varying numbers of look-ahead frames.

Figure 5A:
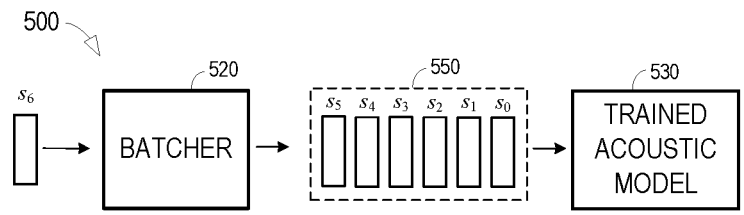
FIG. 5A is a block diagram of a look-ahead-enabled speech recognition system employing initial latency-sensitive adaptive batching during operation according to some embodiments.

FIG. 5A illustrates an example in which batcher 520 collects batches consisting of six raw acoustic feature frames, in which four of the frames (i.e., frames $s_2$, $s_3$, $s_4$ and $s_5$) are look-ahead frames. In some embodiments, the batch size is defined as a window including a start frame and an end frame, and the look-ahead frames are defined by an overlap value. For example, batch 550 may be defined by window {$s_0$, $s_5$} and by an overlap value of four (frames).

Figure 5B:
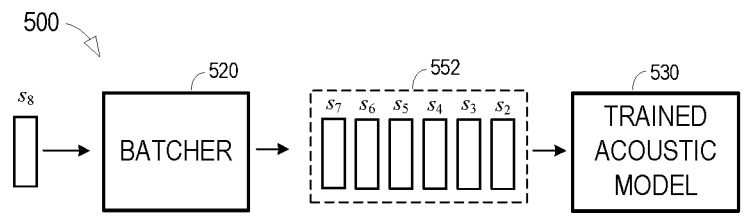
FIG. 5B is a block diagram of a look-ahead-enabled speech recognition system employing initial latency-sensitive adaptive batching during operation according to some embodiments.

FIG. 5B illustrates collection and input of next batch 552 according to the present example. Batch 552 overlaps the last four frames ($s_2$, $s_3$, $s_4$, and $s_5$) of batch 550 and includes look-ahead frames $s_4$, $s_5$, $s_6$ and $s_7$. Therefore, batcher 520 must wait for frames $s_6$ and $s_7$ before generating batch 552.

As described above, model 130 outputs posteriors corresponding to received batches based upon its architecture and trained parameter values as is known in the art. The posteriors are received by a decoder (unshown) which to attempts to form word hypotheses based on the received posteriors.

It will now be assumed that the decoder generates a non-silent, non-noise hypothesis based on the batches received up to the point illustrated in FIG. 5B. Based on the generation of the hypothesis, batcher 520 (or another component) determines to increase the batch size.

Figure 5C:
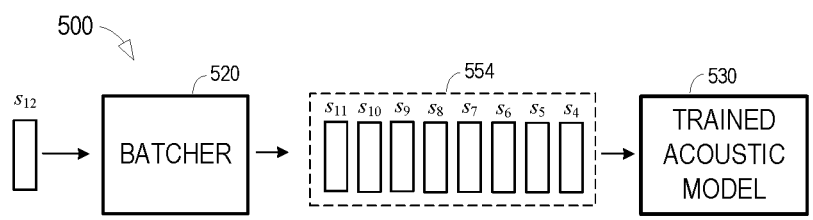
FIG. 5C is a block diagram of a look-ahead-enabled speech recognition system employing initial latency-sensitive adaptive batching during operation according to some embodiments.

FIG. 5C illustrates implementation of a new batch size according to some embodiments. According to the FIG. 5C example, the number of look-ahead frames is fixed, but embodiments are not limited thereto. The example may therefore illustrate operation using a cltLSTM model, which employs a fixed number of look-ahead frames.

As shown in FIG. 5C, the new batch size is eight frames. Next batch 554 therefore includes eight frames and overlaps the last four frames of preceding batch 552. embodiments are not limited thereto. Batch 554 includes look-ahead frames $s_8$, $s_9$, $s_{10}$ and $s_{11}$. Accordingly, after the output of batch 552 as shown in FIG. 1B, batcher 520 collects frames $s_8$ through $s_{11}$ and adds these frames to already-received frames $s_4$ through $s_7$ to generate batch 554.

Figure 5D:
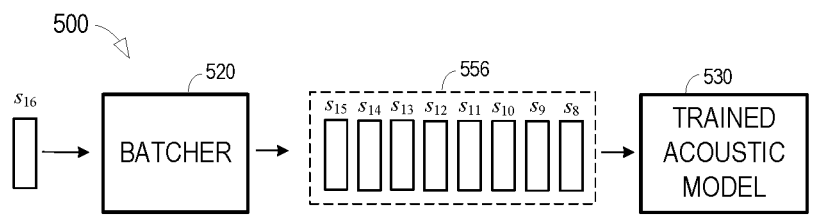
FIG. 5D is a block diagram of a look-ahead-enabled speech recognition system employing initial latency-sensitive adaptive batching during operation according to some embodiments.

FIG. 5D illustrates operation based on the modified batch size. Batcher 520 has collected frames $s_{12}$ through $s_{15}$ and added these frames to already-received frames $s_8$ through $s_{11}$ to generate batch 556. Batch 556 has a batch size of eight frames and includes four look-ahead frames.

As described above, the batch size may increase gradually to a target batch size in some embodiments. These increases may, for example, be responsive to the generation of further hypotheses and/or to an elapsed time since a first hypothesis.

FIGS. 5A through 5D illustrate operation to change a batch size while a number of look-ahead frames remains fixed. In contrast, FIGS. 6A through 6D illustrate look-ahead-enabled speech recognition system 600 employing initial latency-sensitive adaptive look-ahead.

Frame generation unit 610 receives an audio signal and generates a frame-level magnitude spectra, or raw acoustic feature frame, corresponding to a respective frame of the audio signal. Batcher 620 collects generated raw acoustic feature frames into batches of an initial specified batch size (or window) and having a specified number of look-ahead frames (or overlap). Trained acoustic model 630 receives the batches and outputs, for example, senone posteriors which are used by decoder 640 to generate word hypotheses. Trained acoustic model 630 supports batches including different numbers of look-ahead frames, and may therefore comprise a LC-BLSTM model in some embodiments.

Figure 6A:
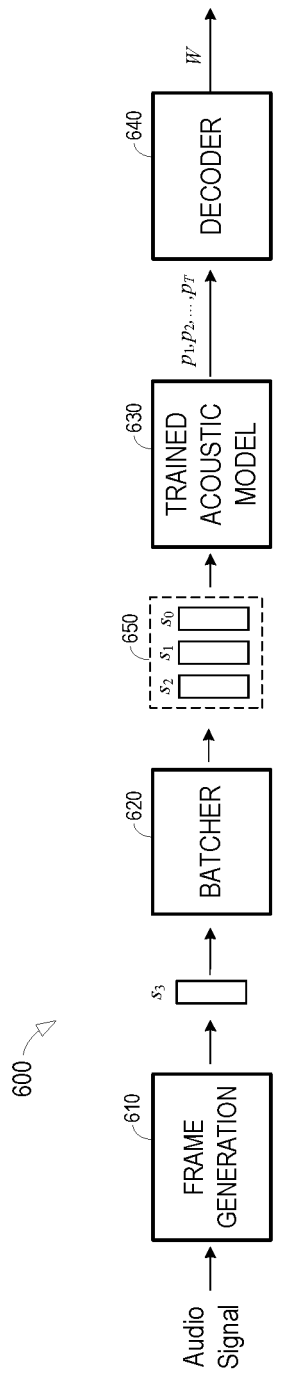
FIG. 6A is a block diagram of a look-ahead-enabled speech recognition system employing initial latency-sensitive adaptive batching and adaptive look-ahead during operation according to some embodiments.
Figure 6B:
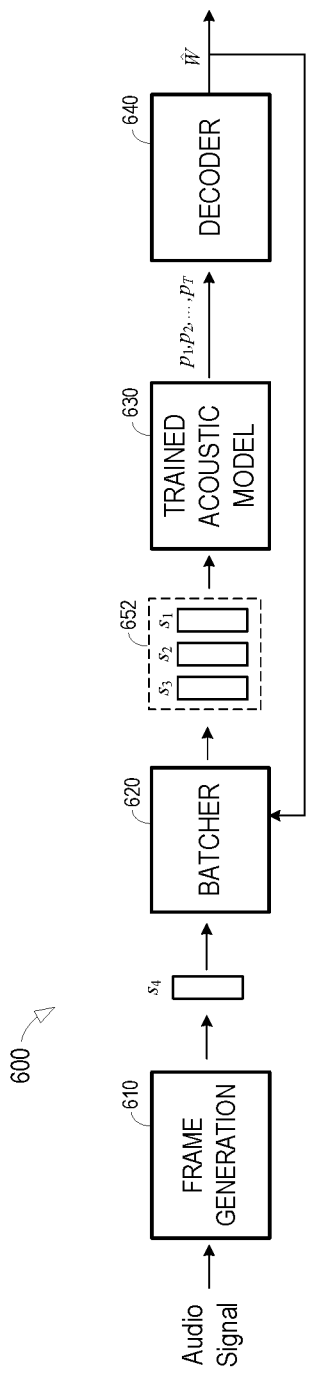
FIG. 6B is a block diagram of a look-ahead-enabled speech recognition system employing initial latency-sensitive adaptive batching and adaptive look-ahead during operation according to some embodiments.

In the example of FIG. 6A, the initial batch size is three and each batch includes two look-ahead frames (i.e., frames $s_1$ and $s_2$ of batch 650). FIG. 6B shows output of next batch 652, which includes three frames and overlaps the two look-ahead frames of batch 650. It will be assumed that decoder 640 now generates a non-silent, non-noise hypothesis based on the batches received up to the present point.

Figure 6C:
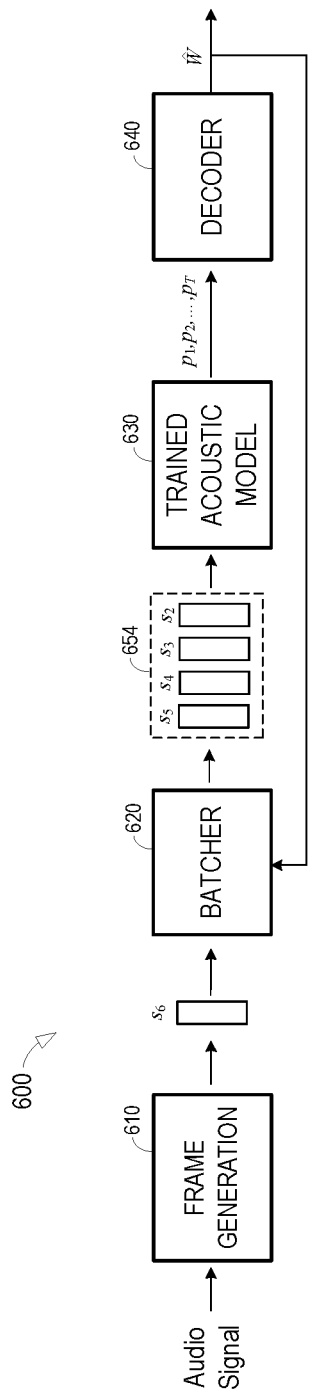
FIG. 6C is a block diagram of a look-ahead-enabled speech recognition system employing initial latency-sensitive adaptive batching and adaptive look-ahead during operation according to some embodiments.
Figure 6D:
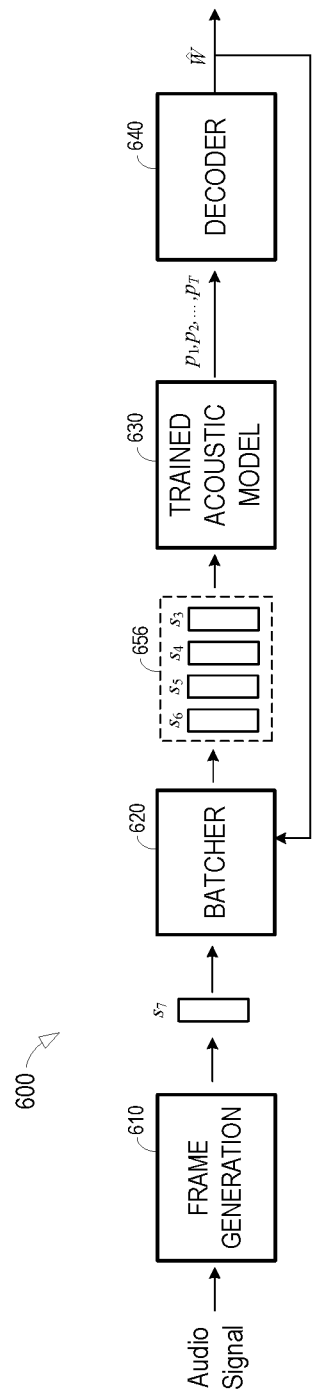
FIG. 6D is a block diagram of a look-ahead-enabled speech recognition system employing initial latency-sensitive adaptive batching and adaptive look-ahead during operation according to some embodiments.

In response, and as shown in FIGS. 6C and 6D, the batch size is changed to four and the number of look-ahead frames per batch is changed to three. Accordingly, batch 654 overlaps look-ahead frames $s_2$ and $s_3$ of batch 652 and includes four frames. The four frames of batch 654 include three look-ahead frames $s_3$, $s_4$ and $s_5$. In view of the now-changed batch size and number of look-ahead frames, batcher 620 collects next batch 656 including four frames. The four frames of batch 656 include frames overlapping look-ahead frames $s_3$, $s_4$ and $s_5$ of batch 654 and also include look-ahead frames $s_4$, $s_5$ and $s_6$.

Embodiments may therefore increase or decrease the batch size and/or the number of look-ahead frames per batch. The increase or decrease to either parameter may occur once or gradually in response to a detected hypothesis.

According to some embodiments, acoustic model 630 and decoder 640 are trained using the batch size and number of look-ahead frames of FIGS. 6C and 6D, and therefore operate optimally after detection of the first word hypothesis. Accordingly, accuracy of acoustic model 630 and decoder 640 may be less than optimal when operated in conjunction with the initial batch size and initial number of look-ahead frames as shown in FIGS. 6A and 6B, as a trade-off for shorter user-perceived latency.

Figure 7A:
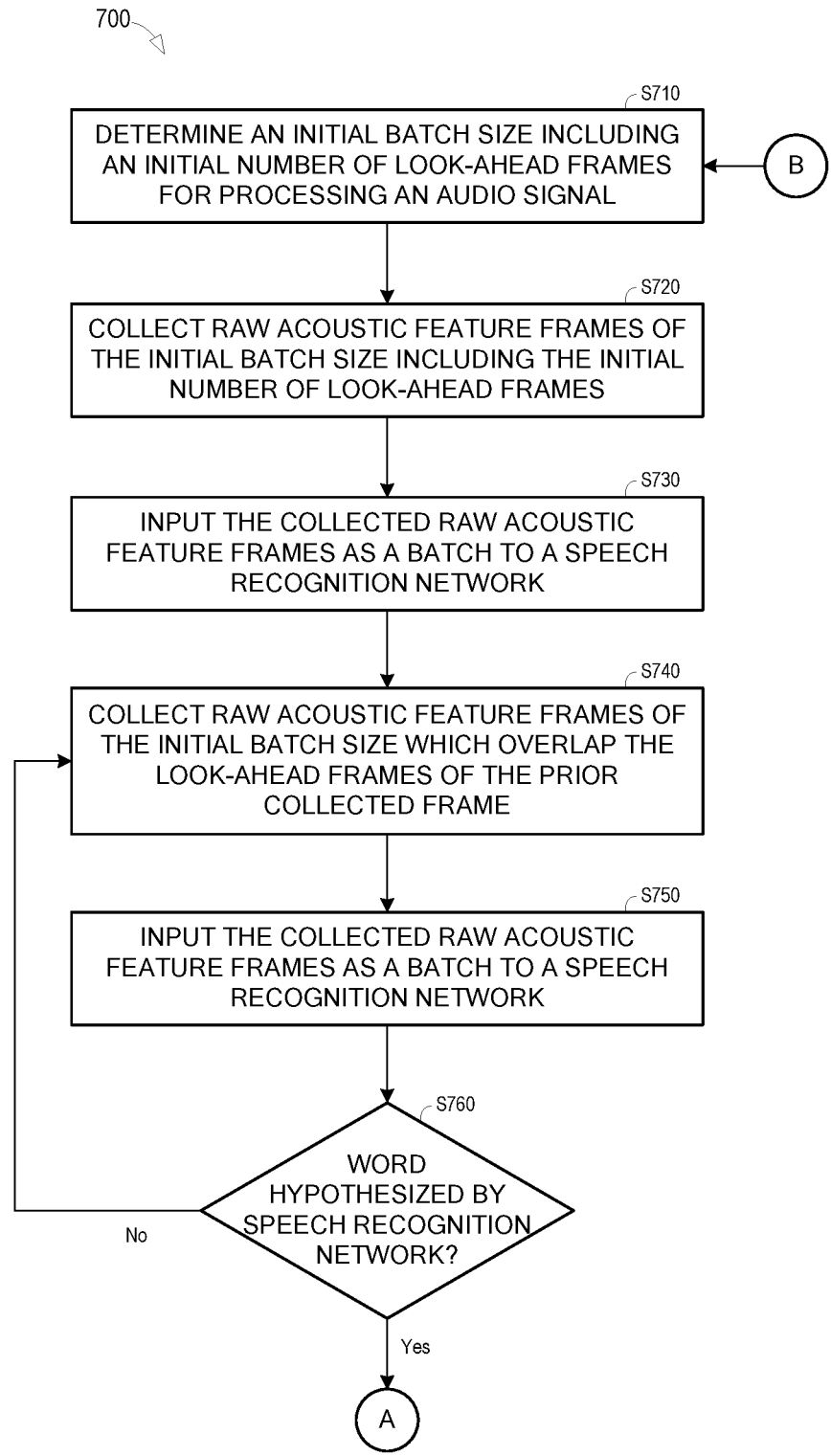
FIGS. 7A and 7B comprise a flow diagram of a process for initial and latency-sensitive adaptive batching and adaptive look-ahead according to some embodiments.
Figure 7B:
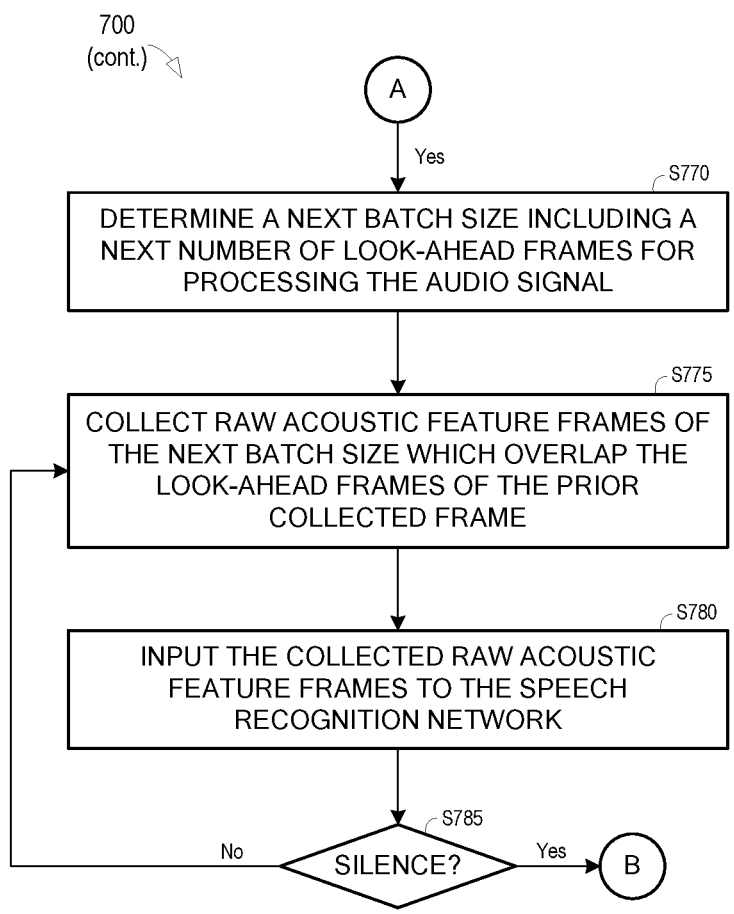

FIGS. 7A and 7B comprise a flow diagram of process 700 to provide dynamic batching according to some embodiments. Process 700 may be implemented by system 600, but embodiments are not limited thereto.

An initial batch size for processing an input audio signal is determined at S710. Also determined at S710 is an initial number of look-ahead frames to be included in each batch. The initial batch size may be designated as a window size and the number of look-ahead frames may be defined as a particular fraction (e.g., ½) of the window size.

Raw acoustic feature frames of the audio signal are collected at S720 based on the initial batch size and initial number of look-ahead frames. As shown in the example of FIG. 6A, and assuming an initial batch size of three frames, flow pauses at S720 while batcher 620 waits to receive frames $s_0$, $s_1$ and $s_2$ from frame generation unit 610.

The collected frames are input as a batch to a speech recognition network at S730. The speech recognition network may comprise any system capable of generating word hypotheses based on batches of acoustic frames which include look-ahead frames.

Next, at S740, raw acoustic feature frames of the audio signal are collected based on the initial batch size and initial number of look-ahead frames. The frames collected at S740 overlap the look-ahead frames of the prior collected frame. With reference to FIG. 6B, batch 652 may be collected at S740, consisting of three frames and overlapping the look-ahead frames $s_1$ and $s_2$ of batch 650. The frames collected at S740 are input as a batch to the speech recognition network at S750.

Collection of frames which overlap the look-ahead frames of a prior collected frame may comprise setting the beginning of the window of the current batch of frames to the start of the overlapped frames of the prior batch. For example, in a case where the overlap is one-half of the window size, the window of the current batch of frames is set to begin at the middle of the window of the prior batch.

S760 comprises determination of whether a word hypothesis has been generated by the speech recognition network, and may be implemented as described above. If a word hypothesis has not yet been generated, flow returns to S740 to collect another batch of frames conforming to the initial batch size, including look-ahead frames, and overlapping the look-ahead frames of the previous batch. Flow therefore cycles between S740, S750 and S760 until a word hypothesis has been generated by the speech recognition network.

Once the determination at S760 is affirmative, a next batch size for processing the audio signal is determined at S770. Determination of a next batch size may also include determination of a next number of look-ahead frames. Accordingly, S770 may include determining a new batch size and/or a new number of look-ahead frames per batch. In some embodiments, S770 comprises determining a next window size, and the next look-ahead size is determined as a function of the next window size. As mentioned above, a new number of look-ahead frames may be determined only if process 700 is executed in conjunction with a speech recognition network capable of processing batches including arbitrary numbers of look-ahead frames.

As described with respect to FIGS. 6C and 6D, raw acoustic feature frames of the next batch size which overlap the prior look-ahead frames are collected at S775 and input to the speech recognition network at S780. Flow cycles between S775 and S780 to collect and input batches of frames until silence is detected at S785. Flow then returns to S710 to reset the batch size and the number of look-ahead frames to their initial values so as to reduce the user-perceived latency of processing subsequently-received speech.

As described with respect to process 400, embodiments of process 700 may further incorporate an end-of-speech detector for independently detecting an end-of-speech state. Based on the detection, a size of a last batch may be reduced (e.g., the window may be shortened) to include only up to the end-of-speech frame.

A neural network (e.g., deep learning, deep convolutional, or recurrent) according to some embodiments comprises a series of "neurons," such as LSTM nodes, arranged into a network. A neuron is an architecture used in data processing and artificial intelligence, particularly machine learning, that includes memory that may determine when to "remember" and when to "forget" values held in that memory based on the weights of inputs provided to the given neuron. Each of the neurons used herein are configured to accept a pre-defined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors, a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. Neurons and neural networks may be constructed programmatically (e.g., via software instructions) or via specialized hardware linking each neuron to form the neural network.

Figure 8:
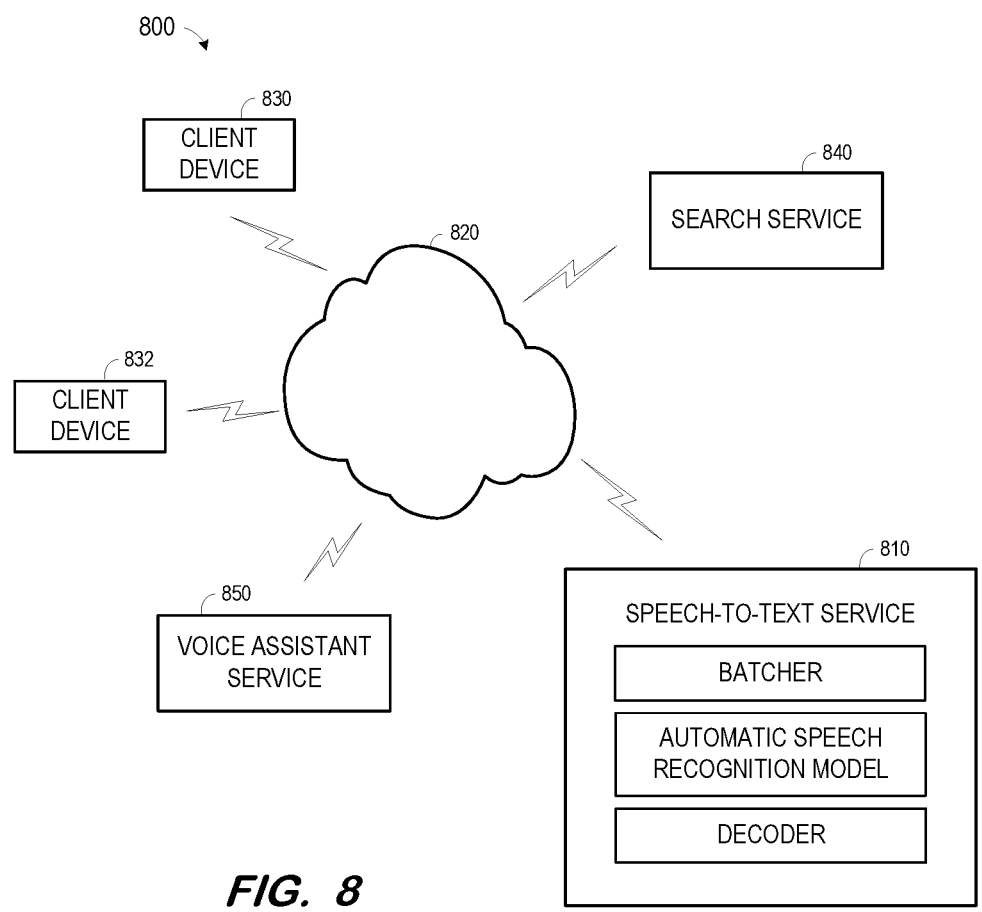
FIG. 8 is a block diagram of a cloud-based speech recognition service according to some embodiments.

FIG. 8 illustrates distributed transcription system 800 according to some embodiments. System 800 may be cloud-based and components thereof may be implemented using on-demand virtual machines, virtual servers and cloud storage instances.

Speech-to-text service 810 may be implemented as a cloud service providing transcription of speech audio signals received over cloud 820. Speech-to-text service 810 may include a batcher component, an ASR model and a decoder operating as described above to provide ASR using latency-sensitive adaptive batching as described herein.

Each of client devices 830 and 832 may be operated to request services such as search service 840 and voice assistant service 850. Services 840 and 850 may, in turn, request speech-to-text functionality from speech-to-text service 810. According to some embodiments, a client device (e.g., a smart speaker, a smartphone) includes all components of a system such as system 100 or system 300, and operation does not require communication with a cloud service. In some embodiments, a client device includes at least one of a frame generation component, a batcher component, an ASR model, a decoder, and, optionally, an end-of-speech detector, and the client device calls a remote system (e.g., a cloud service) to access functionality of any of these components which are not implemented on the client device.

FIG. 9 is a block diagram of system 900 according to some embodiments. System 900 may comprise a general-purpose computing device and may execute program code to provide ASR using latency-sensitive adaptive batching as described herein. System 900 may be implemented by a standalone device such as a personal computer, a smart speaker, and a smartphone, or a cloud-based virtual server according to some embodiments.

System 900 includes processing unit 910 operatively coupled to communication device 920, persistent data storage system 930, one or more input devices 940, one or more output devices 950 and memory 960. Processing unit 910 may comprise one or more processors, processing cores, etc. for executing program code. Communication interface 920 may facilitate communication with external networks, such as the internet. Input device(s) 940 may comprise, for example, a keyboard, a keypad, a mouse or other pointing device, a microphone, a touch screen, and/or an eye-tracking device. Output device(s) 950 may comprise, for example, a display (e.g., a display screen), a speaker, and/or a printer.

Data storage system 930 may comprise any number of appropriate persistent storage devices, including combinations of magnetic storage devices (e.g., magnetic tape, hard disk drives and flash memory), optical storage devices, Read Only Memory (ROM) devices, etc. Memory 960 may comprise Random Access Memory (RAM), Storage Class Memory (SCM) or any other fast-access memory.

Batcher 932 and decoder 936 may comprise program code executable to provide functions as described herein. Batcher 932 and/or decoder 936 may comprise one or more trained neural networks according to some embodiments. Node operator libraries 934 may comprise program code executable to provide an acoustic model defined by hyperparameters 938 and trained parameter values 939 as is known in the art. Data storage device 930 may also store data and other program code for providing additional functionality and/or which are necessary for operation of system 900, such as device drivers, operating system files, etc.

Each functional component and process described herein may be implemented at least in part in computer hardware, in program code and/or in one or more computing systems executing such program code as is known in the art. Such a computing system may include one or more processing units which execute processor-executable program code stored in a memory system.

Processor-executable program code embodying the described processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

The foregoing diagrams represent logical architectures for describing systems according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

The diagrams described herein do not imply a fixed order to the illustrated methods, and embodiments may be practiced in any order that is practicable. Moreover, any of the methods described herein may be performed by hardware, software, or any combination of these approaches. For example, a computer-readable storage medium may store thereon instructions which when executed by a machine result in performance of methods according to any of the embodiments described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
a processing unit; and
a storage device including program code that when executed by the processing unit causes the system to:
determine a first batch size for processing an audio signal;
collect a first batch comprising a first number of raw acoustic feature frames of the audio signal, the first number equal to the first batch size;
input the first batch to a speech recognition network;
determine a second batch size based on a word hypothesis output by the speech recognition network, the second batch size greater than the first batch size;
collect a second batch comprising a second number of acoustic feature frames of the audio signal, the second number equal to the second batch size; and
input the second batch to the speech recognition network.

2. A system according to claim 1, wherein determination of the second batch size based on the word hypothesis comprises detection of a first non-silent word hypothesis output by the speech recognition network and determination of the second batch size in response to the detection.

3. A system according to claim 1, the program code that when executed by the processing unit causes the system to:
collect a plurality of batches, each of the plurality of batches comprising the first number of acoustic feature frames of the audio signal;
input the plurality of batches to the speech recognition network until the word hypothesis is output by the speech recognition network.

4. A system according to claim 1, the program code that when executed by the processing unit causes the system to:
detect an end-of-speech frame; and
reduce a size of a next collected batch of acoustic feature frames to include the end-of-speech frame as a last frame of the next collected batch.

5. A system according to claim 1, wherein the first batch size comprises a first number of look-ahead frames and the first batch comprises first look-ahead frames, the number of first look-ahead frames of the first batch equal to the first number of look-ahead frames, the program code that when executed by the processing unit causes the system to:
collect a third batch comprising the first number of acoustic feature frames of the audio signal, a time period associated with a plurality of frames of the third batch overlapping a time period associated with the first look-ahead frames of the first batch,
wherein determination of the second batch size comprises determination of a second number of look-ahead frames, and
wherein the second batch comprises second look-ahead frames, the number of second look-ahead frames of the second batch equal to the second number of look-ahead frames.

6. A system according to claim 5, wherein the speech recognition network comprises a latency-controlled bi-directional long short-term memory model.

7. A system according to claim 1, wherein the first batch size comprises a first number of look-ahead frames and the first batch comprises first look-ahead frames, the number of first look-ahead frames of the first batch equal to the first number of look-ahead frames, the program code that when executed by the processing unit causes the system to:
collect a third batch comprising the first number of acoustic feature frames of the audio signal, a time period associated with a plurality of frames of the third batch overlapping a time period associated with the first look-ahead frames of the first batch,
wherein the second batch comprises second look-ahead frames, the number of second look-ahead frames of the second batch equal to the first number of look-ahead frames.

8. A system according to claim 7, wherein the speech recognition network comprises a contextual layer-trajectory long short-term memory model.

9. A computer-implemented method comprising:
collecting a first batch of acoustic feature frames of an audio signal, the number of acoustic feature frames of the first batch equal to a first batch size;
inputting the first batch to a speech recognition network;
in response to detection of a word hypothesis output by the speech recognition network, collecting a second batch of acoustic feature frames of the audio signal, the number of acoustic feature frames of the second batch equal to a second batch size, the second batch size greater than the first batch size; and
inputting the second batch to the speech recognition network.

10. A method according to claim 9, wherein detection of the word hypothesis comprises detection of a first non-silent word hypothesis output by the speech recognition network.

11. A method according to claim 9, further comprising:
detecting an end-of-speech frame;
in response to detecting the end-of-speech frame, collecting a third batch of acoustic feature frames of the audio signal, the third batch to include the end-of-speech frame as a last frame of the third batch; and
inputting the third batch to the speech recognition network.

12. A method according to claim 9, wherein the first batch size comprises a first number of look-ahead frames and the first batch comprises first look-ahead frames, the number of first look-ahead frames of the first batch equal to the first number of look-ahead frames, the method further comprising:
collecting a third batch comprising the first number of acoustic feature frames of the audio signal, a time period associated with a plurality of frames of the third batch overlapping a time period associated with the first look-ahead frames of the first batch,
wherein the second batch comprises second look-ahead frames, the number of second look-ahead frames of the second batch equal to the second number of look-ahead frames.

13. A method according to claim 12, wherein the speech recognition network comprises a latency-controlled bi-directional long short-term memory model.

14. A method according to claim 9, wherein the first batch size comprises a first number of look-ahead frames and the first batch comprises first look-ahead frames, the number of first look-ahead frames of the first batch equal to the first number of look-ahead frames, further comprising:
collecting a third batch comprising the first number of acoustic feature frames of the audio signal, a time period associated with a plurality of frames of the third batch overlapping a time period associated with the first look-ahead frames of the first batch,
wherein the second batch comprises second look-ahead frames, the number of second look-ahead frames of the second batch equal to the first number of look-ahead frames.

15. A method according to claim 14, wherein the speech recognition network comprises a contextual layer-trajectory long short-term memory model.

16. A non-transient computer-readable medium storing program code to be executed by a processing unit to provide:
a speech recognition network;
a batcher to:
collect a first batch of acoustic feature frames of an audio signal, the number of acoustic feature frames of the first batch equal to a first batch size;
input the first batch to the speech recognition network;
in response to detection of a word hypothesis output by the speech recognition network, collect a second batch of acoustic feature frames of the audio signal, the number of acoustic feature frames of the second batch equal to a second batch size, the second batch size greater than the first batch size; and
input the second batch to the speech recognition network.

17. A non-transient computer-readable medium according to claim 16, storing program code to be executed by a processing unit to provide:
an end-of-speech detector to:
receive acoustic feature frames of the audio signal independent of reception of acoustic feature frames by the batcher; and
detect an end-of-speech frame based on the received acoustic feature frames;
wherein response to detection of the end-of-speech frame, the batcher is further to collect a third batch of acoustic feature frames of the audio signal, the third batch to include the end-of-speech frame as a last frame of the third batch, and input the third batch to the speech recognition network.

18. A non-transient computer-readable medium according to claim 16, wherein the first batch size comprises a first number of look-ahead frames and the first batch comprises first look-ahead frames, the number of first look-ahead frames of the first batch equal to the first number of look-ahead frames, wherein the batcher is further to:
collect a third batch comprising the first number of acoustic feature frames of the audio signal, a time period associated with a plurality of frames of the third batch overlapping a time period associated with the first look-ahead frames of the first batch,
wherein the second batch comprises second look-ahead frames, the number of second look-ahead frames of the second batch equal to the second number of look-ahead frames, and
wherein the speech recognition network comprises a latency-controlled bi-directional long short-term memory model.

19. A non-transient computer-readable medium according to claim 16, wherein the first batch size comprises a first number of look-ahead frames and the first batch comprises first look-ahead frames, the number of first look-ahead frames of the first batch equal to the first number of look-ahead frames, wherein the batcher is further to:
collect a third batch comprising the first number of acoustic feature frames of the audio signal, a time period associated with a plurality of frames of the third batch overlapping a time period associated with the first look-ahead frames of the first batch,
wherein the second batch comprises second look-ahead frames, the number of second look-ahead frames of the second batch equal to the first number of look-ahead frames, and
wherein the speech recognition network comprises a contextual layer-trajectory long short-term memory model.

20. A non-transient computer-readable medium according to claim 16, wherein detection of the word hypothesis comprises detection of a first non-silent word hypothesis output by the speech recognition network.

* * * * *